United States Patent
Glime, III et al.

(10) Patent No.: US 11,808,381 B2
(45) Date of Patent: Nov. 7, 2023

(54) VALVES WITH INTEGRATED ORIFICE RESTRICTIONS

(71) Applicant: Swagelok Company, Solon, OH (US)

(72) Inventors: William H. Glime, III, Chagrin Falls, OH (US); James G. McCoy, Beachwood, OH (US); Branden W. Keeper, Mentor, OH (US)

(73) Assignee: SWAGELOK COMPANY, Solon, OH (US)

(*) Notice: Subject to any disclaimer, the term of this patent is extended or adjusted under 35 U.S.C. 154(b) by 80 days.

(21) Appl. No.: 17/517,317

(22) Filed: Nov. 2, 2021

(65) Prior Publication Data

US 2022/0136610 A1 May 5, 2022

Related U.S. Application Data

(60) Provisional application No. 63/109,496, filed on Nov. 4, 2020.

(51) Int. Cl.
*F16K 27/02* (2006.01)
*F16K 7/17* (2006.01)

(52) U.S. Cl.
CPC ............ *F16K 7/17* (2013.01); *F16K 27/0236* (2013.01)

(58) Field of Classification Search
CPC ..... F16K 7/14; F16K 7/16; F16K 7/17; F16K 27/0236; F16K 47/08
See application file for complete search history.

(56) References Cited

U.S. PATENT DOCUMENTS

| | | |
|---|---|---|
| 5,314,164 A | 5/1994 | Smith |
| 5,334,864 A | 8/1994 | Romann et al. |
| 5,335,691 A | 8/1994 | Kolenc |

(Continued)

FOREIGN PATENT DOCUMENTS

| | | |
|---|---|---|
| CN | 102354228 | 2/2012 |
| CN | 106461097 | 2/2017 |

(Continued)

OTHER PUBLICATIONS

International Search Report and Written Opinion from PCT/US2021/057663 dated Feb. 24, 2022.

(Continued)

*Primary Examiner* — Hailey K. Do
(74) *Attorney, Agent, or Firm* — Calfee, Halter & Griswold LLP

(57) ABSTRACT

A valve includes a valve body having first and second fluid ports extending to a valve cavity, a seat carrier subassembly installed in the valve cavity and including a seat carrier body with a first annular inner wall defining a first flow aperture aligned with the first fluid port and a valve seat disposed in an annular recess surrounding the first annular inner wall, and a second annular inner wall defining a second flow aperture aligned with the second fluid port. A valve element is disposed within the valve cavity and is movable between a closed position sealing against the valve seat and an open position permitting fluid flow across the valve seat between the first and second flow apertures. An outer periphery of an orifice restriction is seated against an interior portion of one of the first annular inner wall and the second annular inner wall.

28 Claims, 16 Drawing Sheets

(56) References Cited

U.S. PATENT DOCUMENTS

| | | |
|---|---|---|
| 5,881,997 A | 3/1999 | Ogawa et al. |
| 5,909,747 A | 6/1999 | Schieber |
| 6,000,416 A | 12/1999 | Kingsford et al. |
| 6,003,791 A | 12/1999 | Reiter |
| 6,131,826 A | 10/2000 | Teiwes |
| 6,145,761 A | 11/2000 | Muller et al. |
| 6,289,923 B1 | 9/2001 | Ohmi et al. |
| 6,289,925 B1 | 9/2001 | Miyazoe et al. |
| 6,464,202 B1 | 10/2002 | Boecking |
| 6,871,803 B1 | 3/2005 | Tadahiro et al. |
| 7,150,444 B2 | 12/2006 | Ohmi et al. |
| 7,175,157 B2 | 2/2007 | Taikawa et al. |
| 8,251,347 B2 | 8/2012 | Schmit et al. |
| 9,188,989 B1 | 11/2015 | Mudd et al. |
| 9,194,351 B2 | 11/2015 | Albrodt et al. |
| 9,587,608 B2 | 3/2017 | Jeannel et al. |
| 9,746,102 B2 | 8/2017 | Yasuda et al. |
| 9,829,061 B2 | 11/2017 | Ewers et al. |
| 9,863,542 B2 | 1/2018 | Swagelok |
| 10,006,558 B2 | 6/2018 | Suematsu |
| 10,145,479 B2 | 12/2018 | Kitano et al. |
| 10,781,892 B2 | 9/2020 | Cobb et al. |
| 10,877,495 B2 | 12/2020 | Ackerman et al. |
| 10,982,634 B2 | 4/2021 | Fochtman et al. |
| 11,054,052 B2 | 7/2021 | Dohi et al. |
| 11,162,597 B2 * | 11/2021 | Watanabe ............... F16L 55/00 |
| 11,231,026 B2 | 1/2022 | Watanabe et al. |
| 11,427,911 B2 * | 8/2022 | Watanabe ............... F16K 11/04 |
| 2002/0110426 A1 | 8/2002 | Stankus et al. |
| 2003/0042459 A1 | 3/2003 | Gregoire |
| 2006/0060813 A1 | 3/2006 | Iwabuchi et al. |
| 2007/0295405 A1 | 12/2007 | Okabe et al. |
| 2008/0061171 A1 | 3/2008 | Bayer |
| 2008/0224081 A1 | 9/2008 | Miyazaki et al. |
| 2011/0308655 A1 | 12/2011 | Keeper et al. |
| 2014/0217321 A1 | 8/2014 | Glime |
| 2019/0178389 A1 | 6/2019 | Sawada et al. |
| 2021/0207722 A1 | 7/2021 | Nakamura et al. |
| 2021/0332900 A1 | 10/2021 | Sato et al. |

FOREIGN PATENT DOCUMENTS

| | | |
|---|---|---|
| EP | 1300619 | 4/2003 |
| JP | H10-332020 | 12/1998 |
| JP | 2004-362036 | 12/2004 |
| JP | 2007-200133 | 8/2007 |
| JP | 2020-204369 | 12/2020 |
| JP | 2021-021408 | 2/2021 |
| KR | 10-2016-0129737 | 11/2016 |
| WO | 2019/047916 | 3/2019 |
| WO | 2021/101855 | 5/2021 |

OTHER PUBLICATIONS

International Search Report and Written Opinion from PCT/US2021/057808 dated Feb. 24, 2022.

Danfoss Data Sheet, Valve Station, copyright May 2018, 50 pgs.

* cited by examiner

VALVES WITH INTEGRATED ORIFICE RESTRICTIONS

CROSS-REFERENCE TO RELATED APPLICATION

This application claims priority to and all benefit of U.S. Provisional Patent Application Ser. No. 63/109,496, filed on Nov. 4, 2020, for VALVES WITH INTEGRATED ORIFICE RESTRICTIONS, the entire disclosure of which is fully incorporated herein by reference.

TECHNICAL FIELD

The inventions relate to fluid flow and delivery devices and methods, and more particularly to valves used to control fluid flow and delivery.

BACKGROUND

Valves are well known for use as flow control devices for gas and liquid fluid delivery. In the semiconductor industry as well as others, delivery of process chemicals during various processing operations is controlled using valves, for example, high purity valves. Exemplary applications for valves used in the semiconductor industry include chemical vapor deposition (CVD) and atomic layer deposition (ALD). In many applications, rapid precise control of the amount of fluid supplied is required.

SUMMARY

In accordance with an exemplary aspect of one or more of the inventions presented in this disclosure, a valve includes a valve body, a seat carrier subassembly, a valve element, and an orifice restriction. The valve body includes a valve cavity and first and second fluid ports extending to the valve cavity. The seat carrier subassembly is installed in the valve cavity and includes a seat carrier body including a first annular inner wall defining a first flow aperture aligned with the first fluid port and a valve seat disposed in an annular recess surrounding the first annular inner wall, and a second annular inner wall defining a second flow aperture aligned with the second fluid port. The valve element is disposed within the valve cavity and is movable between a closed position sealing against the valve seat and an open position permitting fluid flow across the valve seat between the first and second flow apertures. The orifice restriction has an outer periphery seated against an interior portion of one of the first annular inner wall and the second annular inner wall.

In accordance with another exemplary aspect of one or more of the inventions presented in this disclosure, a valve includes a valve body having a valve cavity and first and second fluid ports extending to the valve cavity, an annular valve seat surrounding the first fluid port, a valve element disposed within the valve cavity and movable between a closed position sealing against the valve and an open position permitting fluid flow across the valve seat, and an orifice restriction comprising an orifice carrier retaining a flow restricting orifice disc, with the orifice carrier being seated against an annular inner wall aligned with one of the first and second fluid ports to restrict flow through the one of the first and second fluid ports.

In accordance with another exemplary aspect of one or more of the inventions presented in this disclosure, a valve includes a valve body having a valve cavity and first and second fluid ports extending to the valve cavity, an annular valve seat surrounding the first fluid port, a valve element disposed within the valve and movable between a closed position sealing against the valve and an open position permitting fluid flow across the valve seat, and an orifice restriction seated against an annular inner wall aligned with one of the first and second fluid ports to restrict flow through the one of the first and second fluid ports. The orifice restriction is captured between an interior portion of the annular inner wall and a weld ring welded to the seat carrier body.

In accordance with another exemplary aspect of one or more of the inventions presented in this disclosure, a valve includes a valve body having a valve cavity and first and second fluid ports extending to the valve cavity, an annular valve seat secured in an annular recess surrounding the first fluid port, the annular recess being defined by an inner annular wall and an outer annular wall, a valve element disposed within the valve and movable between a closed position sealing against the valve seat and an open position permitting fluid flow across the valve seat, and an orifice restriction having an outer periphery axially captured between an internal counterbore in the valve seat and the annular inner wall.

DESCRIPTION OF EXEMPLARY EMBODIMENTS

Figure 1:
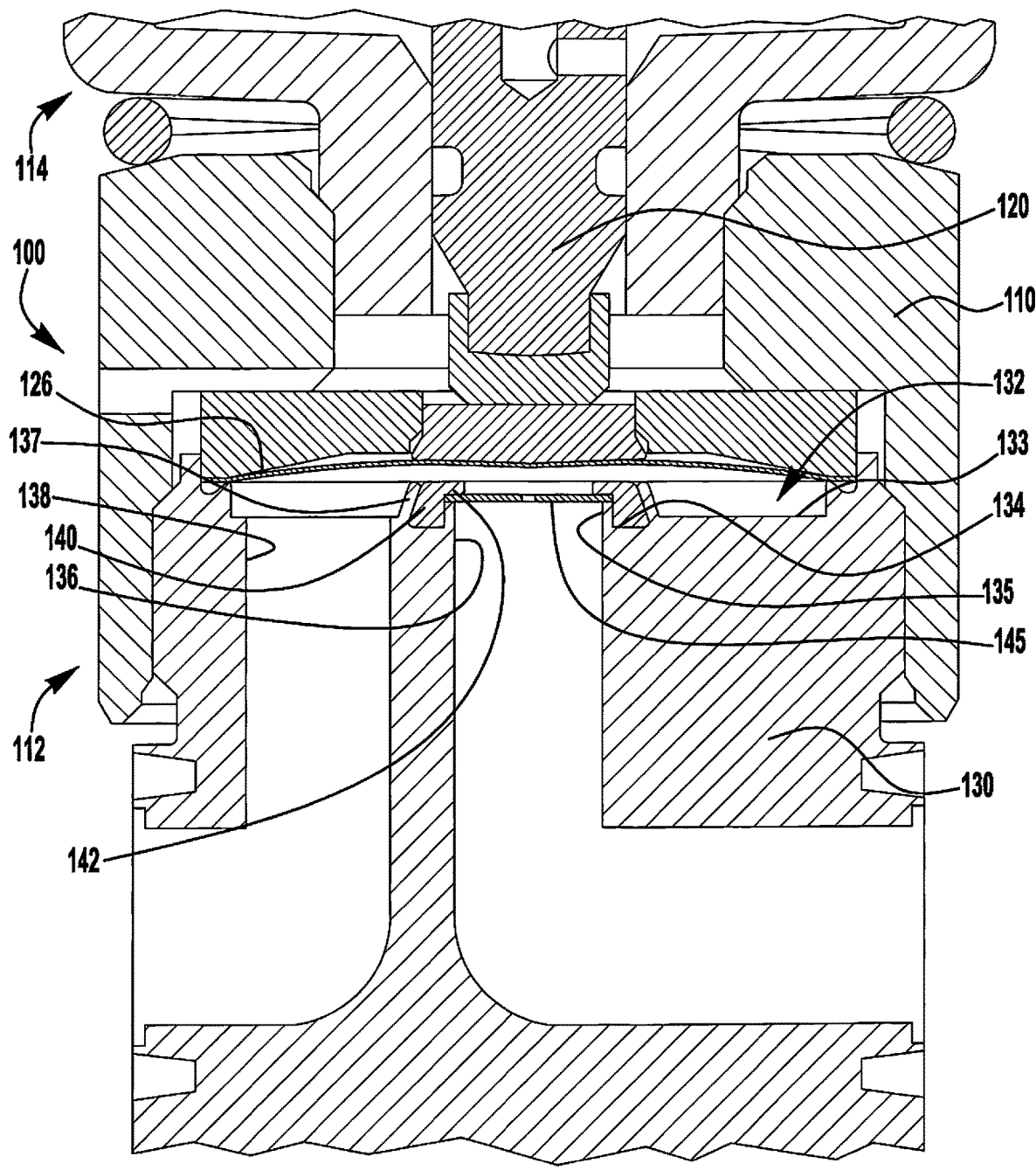
FIG. 1 is a cross-sectional view of a valve assembly with an integrated orifice restriction, according to an exemplary embodiment of the present disclosure.

This Detailed Description merely describes exemplary embodiments and is not intended to limit the scope of the claims in any way. Indeed, the invention as claimed is broader than and unlimited by the exemplary embodiments, and the terms used in the claims have their full ordinary meaning.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

Flow orifices are commonplace in applications where a controlled or restricted flow is desired. In semiconductor applications flow orifices are often placed near a valve so that flow through the orifice can be turned on an off. A precision orifice, such as a wire-honed ruby insert, provides a means to have a similar flow rate across multiple streams simply by providing a uniform pressure upstream of the orifice. An orifice is also used in conjunction with a pressure control device to provide a degree of flow control in a fluid system.

In semiconductor applications surface mount component configurations are commonly employed. In these systems flow orifices are commonly disposed in orifice plates that are placed between the surface mount component and substrate, in a "C-seal" or VCR® gasket used to create a hermetic seal between connected components, and sometimes integrated directly into the control valves. The orifice can be placed in a separate component with a precision hole geometry that is integrated into a seal or valve component or the orifice can be directly created in a valve component by conventional drilling, laser drilling, or other means to form a precision hole. In most applications where flow orifices are used it is desirable to provide a means for the orifice to be easily replaced in the event the flow conditions need to be changed or there is a problem with the orifice.

When the orifice is used in conjunction with a control valve the volume between the orifice and the shutoff point or valve seat of the valve is often an important consideration. The flow through an orifice is a function of the pressure gradient across the orifice. When used in conjunction with a shutoff valve that controls the flow through the orifice there will exist a transient period where the pressure conditions across the orifice shift from a non-flowing (similar pressure upstream and downstream of the orifice) to a more steady state condition where the pressure differential across the orifice has reached an equilibrium. The duration of the transient state where the flow thru the orifice is changing is a function of the volume between the orifice and shutoff valve.

An orifice placed downstream of a shutoff valve in the closed state will reach equilibrium with the pressure conditions downstream of the valve and an orifice placed upstream of a shutoff valve will reach equilibrium with the pressure conditions upstream of the shutoff valve. When the orifice is placed downstream of the shutoff valve a change in state of the valve from closed to open produces a transient state that delivers a lower than equilibrium flow while the volume between the shutoff valve and orifice charges to the equilibrium pressure. In this configuration when the upstream valve changes state from open to closed the flow through the orifice will begin to decay and the transient period where flow continues through the orifice will also be a function of the volume between orifice and shutoff valve. When a flow orifice resides upstream of a shutoff valve a "burst" of flow associated with the volume between the orifice and valve that is in equilibrium with the upstream pressure being rapidly released through the opening shutoff valve. In the upstream orifice configuration, closing the shutoff valve produces a more discrete cessation of flow downstream of the valve but there remains a transient flow condition through the orifice as the volume between orifice and shutoff valve charges to the upstream system pressure. In many applications it is important to minimize the transient behavior to provide a more discrete realization of the desired steady-state flow conditions through the flow orifice. Minimizing the volume between flow orifice and shutoff valves helps reduce the duration of transient flow conditions when the shutoff valve changes state.

According to an exemplary aspect of the present disclosure, a valve may be provided with a flow restricting orifice adjacent to the valve seat to minimize the fluid volume between the valve seat and the flow restricting orifice, to reduce the duration of transient flow conditions when the shutoff valve changes state. In some such valve arrangements, a valve may include an annular valve seat staked or otherwise secured in an annular recess in a seating surface of a valve cavity, surrounding a fluid port in the valve cavity, with a flow restricting orifice disc or other such insert captured between the valve seat and the valve cavity. Such an arrangement effectively positions the flow restricting orifice adjacent to the valve seat or valve shutoff point, thereby minimizing the volume between the seat seal and the flow restricting orifice.

With reference to FIG. 1, in an exemplary embodiment, an actuated valve assembly 100 includes a shutoff valve 112 and an actuator 114 (e.g., a pneumatic actuator) operable to move an actuator stem 120 for direct or indirect actuating engagement of a valve element (e.g., diaphragm, as shown) 126 within the valve. The valve 112 includes a valve body 130 having a valve cavity 132 partially defined by a seating surface 133, and first and second fluid ports 136, 138 extending to the seating surface. A bonnet nut 110 assembled with the valve body 130 applies a clamping force to an outer periphery of the diaphragm 126 to seal the diaphragm against an outer periphery of the seating surface 133. The exemplary seating surface 133 includes an annular groove or recess 134 surrounding the first fluid port 136. An annular valve seat 140 (e.g., a plastic or polymer seat ring) is staked or otherwise secured (e.g., press fit or interference fit) in the recess 134. While many different seat retaining arrangements may be used, in the illustrated embodiment, the recess 134 is defined by an annular inner wall portion 135 and an annular outer wall portion 137. Once the valve seat is inserted into the recess 134, the outer wall portion 137 may be staked or crimped radially inward to securely retain the valve seat 140. As used herein, "annular" may include circular, as shown, or any other suitable surrounding shape (e.g., oblong, elliptical, etc.).

When the diaphragm 126 is moved into sealing contact with the valve seat 140 by operation of the actuator 114, the valve 112 is in a closed position, and when the diaphragm 126 moves out of contact from the valve seat 140, the valve 112 is in an open position, permitting fluid flow across the valve seat. Fluid flow may pass through the valve 112 from the first port 136 serving as an inlet or upstream port to the second port 138 serving as an outlet or downstream port; however, flow direction may also be reversed.

To provide a flow restriction within the valve 112, the valve seat 140 may be configured to function as an orifice carrier, with an internal counterbore or shoulder 142 of the valve seat receiving an orifice restriction (e.g., a flow restricting orifice disc or insert 145), for example, as a press fit subassembly. When the valve seat 140 is staked, crimped, or otherwise installed into the seating surface recess 134, the flow restricting orifice disc 145 is captured or sandwiched between the valve seat counterbore 142 and an annular inner wall portion 135 disposed between the annular recess 134 and the first port 136.

Figure 2:
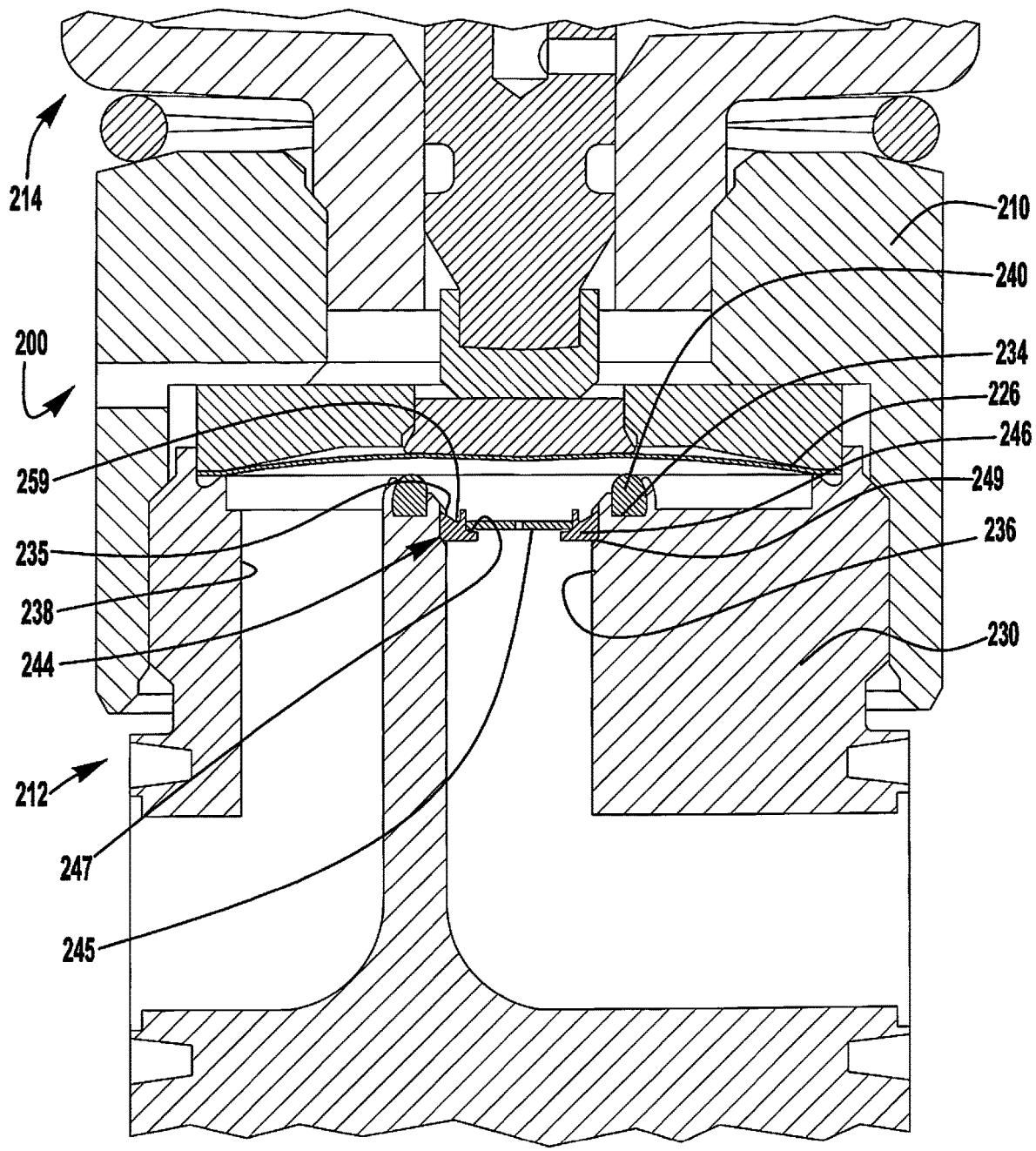
FIG. 2 is a cross-sectional view of a valve assembly with an integrated orifice restriction, according to another exemplary embodiment of the present disclosure.
Figure 2A:
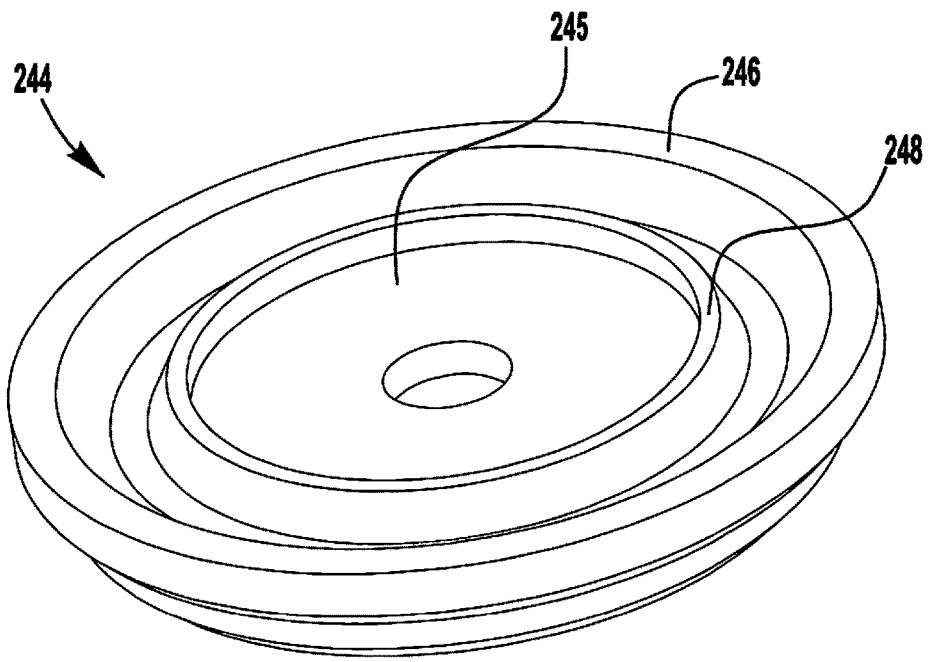
FIG. 2A is a perspective view of an orifice carrier and orifice insert, according to another exemplary embodiment of the present disclosure.
Figure 2B:
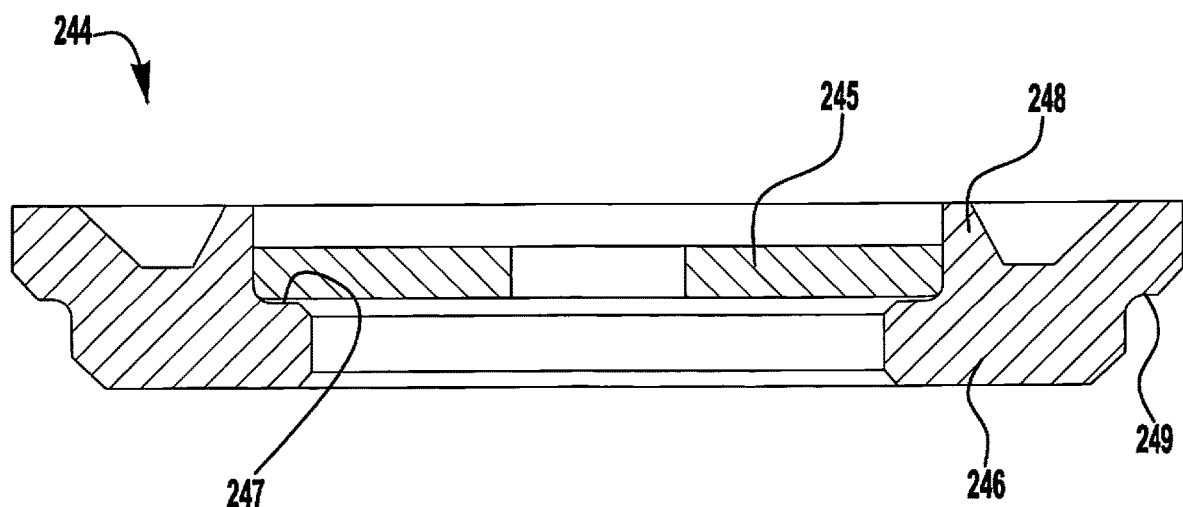
FIG. 2B is a cross-sectional view of the orifice carrier and orifice insert of FIG. 2A.

In another exemplary embodiment, a flow restricting orifice disc may be assembled with (e.g., staked into, welded to) a valve seating surface at a first fluid port, radially inward of the valve seat. FIG. 2 illustrates an actuated valve assembly 200, similar to the actuated valve assembly 100 of FIG. 1, but with an orifice restriction 244 assembled with an interior portion of an annular inner wall portion 235 of the valve body 230, inward of the valve seat retaining recess 234 and surrounding the first fluid port 236. The annular inner wall portion 235 may be staked or crimped over the outer periphery of the orifice restriction 244. While the orifice restriction 244 may be provided as a single piece component to be assembled with the inner wall portion, in the illustrated example, as shown in FIGS. 2, 2A, and 2B, the orifice restriction 244 includes an orifice carrier 246 retaining a flow restricting orifice disc 245 and assembled with the inner wall portion 235, for example, with an outer peripheral step or shoulder 249 seated against an inner peripheral recess 239 of the inner wall portion. The exemplary orifice carrier 246 includes an inner diameter counterbore 247 that receives the flow restricting orifice disc 245, and a surrounding wall portion 248 that may be staked or crimped over the outer edge of the orifice disc for secure, sealed retention therewith.

Figure 2C:
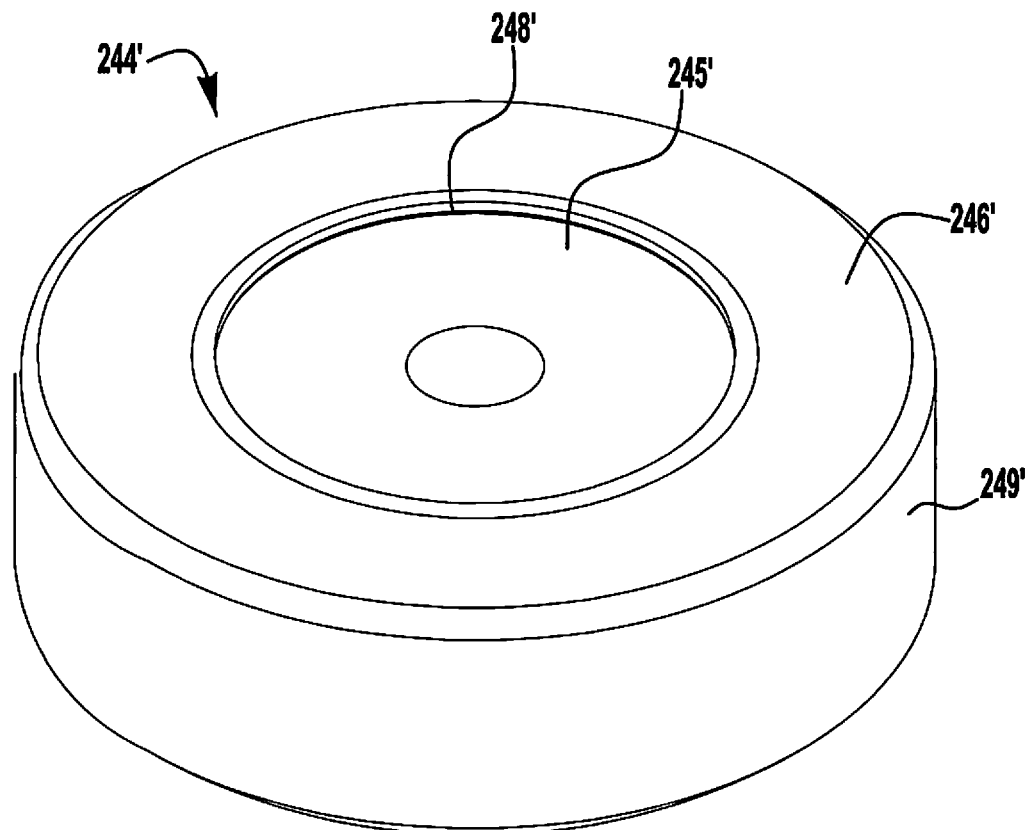
FIG. 2C is a perspective view of another orifice carrier and orifice insert, according to another exemplary embodiment of the present disclosure.
Figure 2D:
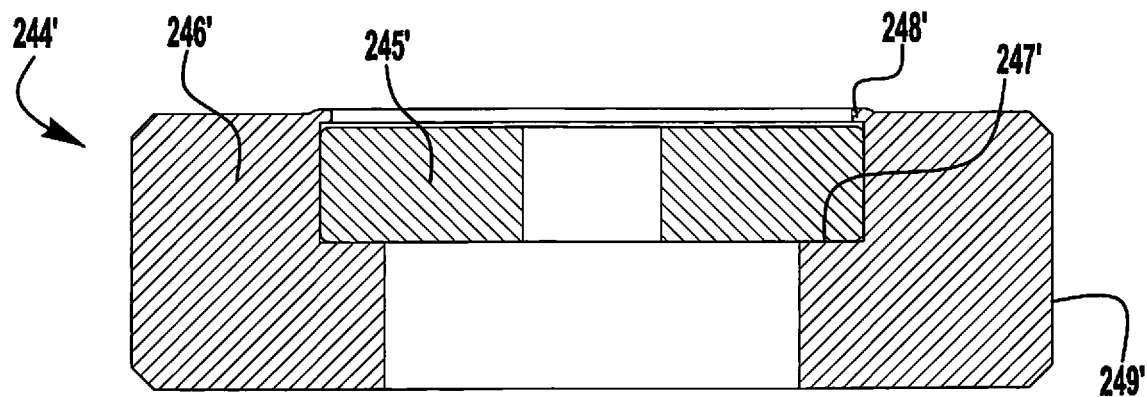
FIG. 2D is a cross-sectional view of the orifice carrier and orifice insert of FIG. 2C.

The outer periphery 249 of the orifice carrier 246 of FIGS. 2A and 2B may be press fit or staked into seating engagement with the inner wall portion 235 of the valve body 230. In other embodiments, an orifice carrier may be configured for welded retention with the valve body. FIGS. 2C and 2D illustrate an orifice restriction 244' including an orifice carrier 246' having a substantially cylindrical outer periphery 249' and an inner diameter counterbore 247' sized to receive an orifice disc or insert 245' press fit or staked into the counterbore. An inner lip portion 248' may be crimped over the orifice disc 245' to securely and sealingly retain the orifice disc with the orifice carrier 246'.

Figure 2E:
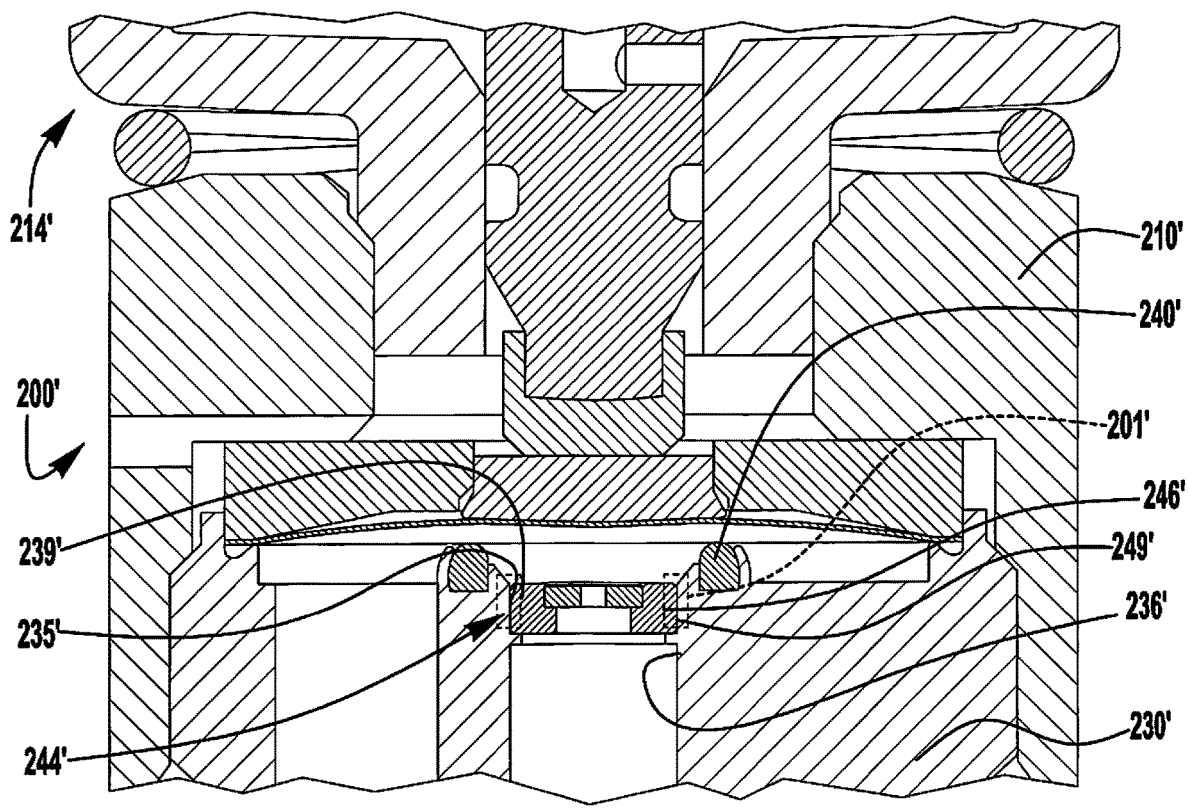
FIG. 2E is a cross-sectional view of a valve assembly with the orifice carrier and orifice insert of FIG. 2C, according to another exemplary embodiment of the present disclosure.

FIG. 2E illustrates an exemplary valve assembly 200' having an orifice restriction 244' (e.g., the orifice restriction of FIGS. 2C-2D) welded with an interior portion of an annular inner wall portion 235' of the valve body 230', inward of the valve seat 240' and surrounding the first fluid port 236'. The cylindrical outer periphery 249' of the orifice carrier 246' may be seated in a counterbore portion 239' of the annular inner wall portion 235' and welded (at annular weld bead 201') to the annular inner wall portion, for example, to securely and sealingly retain the orifice restriction 244' with the valve body 230'. The weld bead 201' may extend along the entire junction between the counterbore portion 239' and the cylindrical outer periphery 249' (e.g., through to the base flange portion of the counterbore), or only a portion of the junction sufficient to eliminate any crevice or seam between the orifice carrier 246' and the annular inner wall portion 235'.

Figure 3:
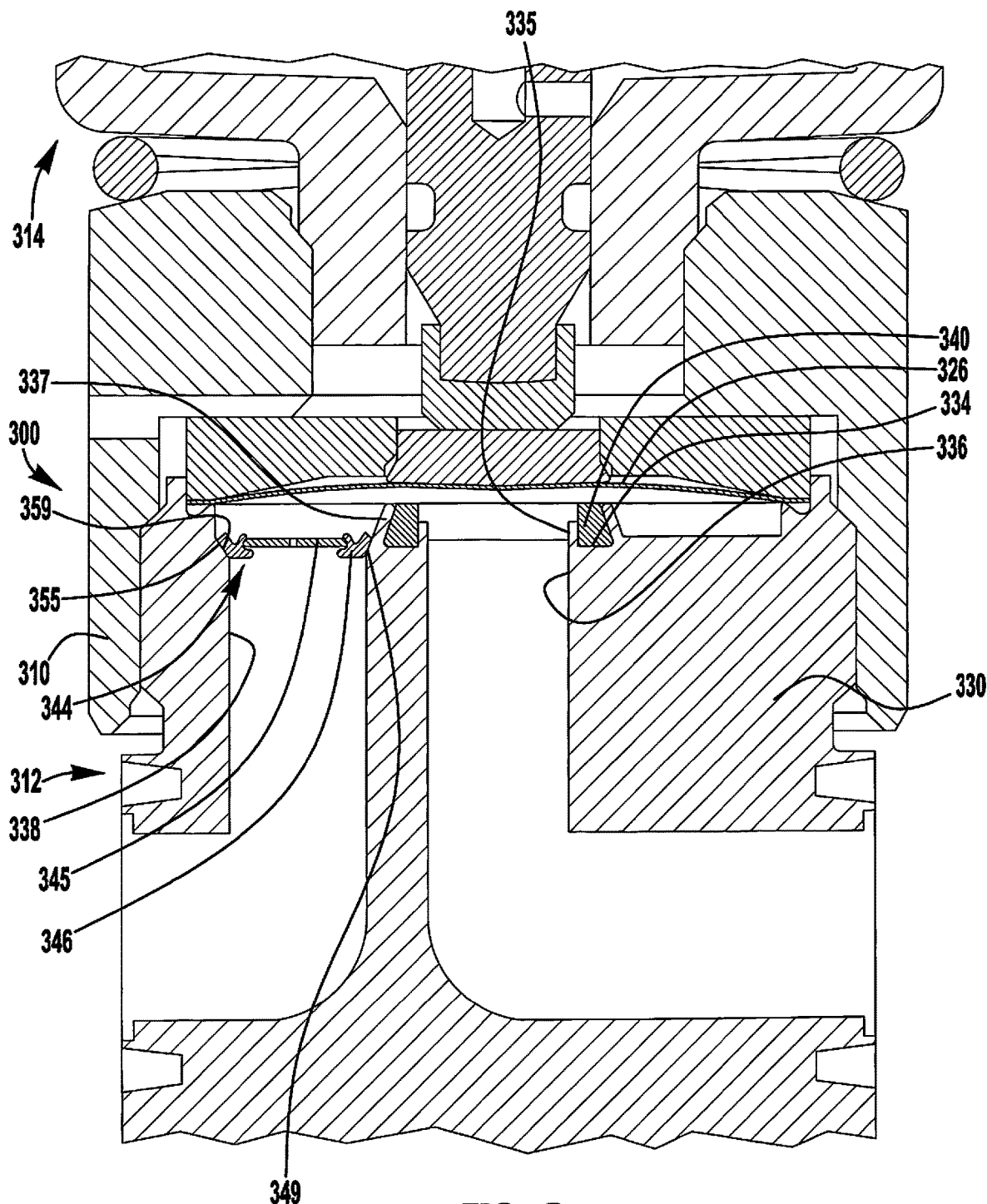
FIG. 3 is a cross-sectional view of a valve assembly with an integrated orifice restriction, according to another exemplary embodiment of the present disclosure.

In another exemplary embodiment, a flow restricting orifice disc may be assembled with (e.g., staked into, welded to) a valve seating surface at a second fluid port, radially offset from the valve seat. FIG. 3 illustrates an actuated valve assembly 300, similar to the actuated valve assembly 200 of FIG. 2, but with an orifice restriction 344 assembled with an interior portion of an annular inner wall portion 355 at the second fluid port 338. While the orifice restriction may be provided as a single piece component to be assembled with the inner wall portion, in the illustrated example, an orifice carrier 346 retaining a flow restricting orifice disc 345 (which may, but need not, be similar to the orifice carrier 246 and disc 245 arrangement shown in FIGS. 2 and 2A and described above) is assembled with the inner wall portion 355, for example, with an outer peripheral step or shoulder 349 seated against an inner peripheral recess 359 of the inner wall portion.

As shown in FIGS. 1-3, the seating surface 133, 233, 333, annular seat recess 134, 234, 334, inner wall portions 135, 235, 355, outer wall portions 137, 237, 337 and first and second ports 136, 236, 336, 138, 238, 338 may be integral with and entirely defined by the valve body 130, 230, 330, for installation or assembly of the valve seat 140, 240, 340 and orifice restriction 145, 245, 345 directly with the valve body 130, 230, 330. In other embodiments, a valve may be provided with a replaceable seat carrier subassembly or cartridge that includes a valve seat (e.g., a staked or crimped plastic or polymeric seat) and a flow restricting orifice (e.g., flow restricting orifice insert or disc), for example, to allow for replacement of a worn or damaged valve seat, and/or replacement of an orifice restriction (e.g., to adjust the desired flow rate through the valve).

Figure 4:
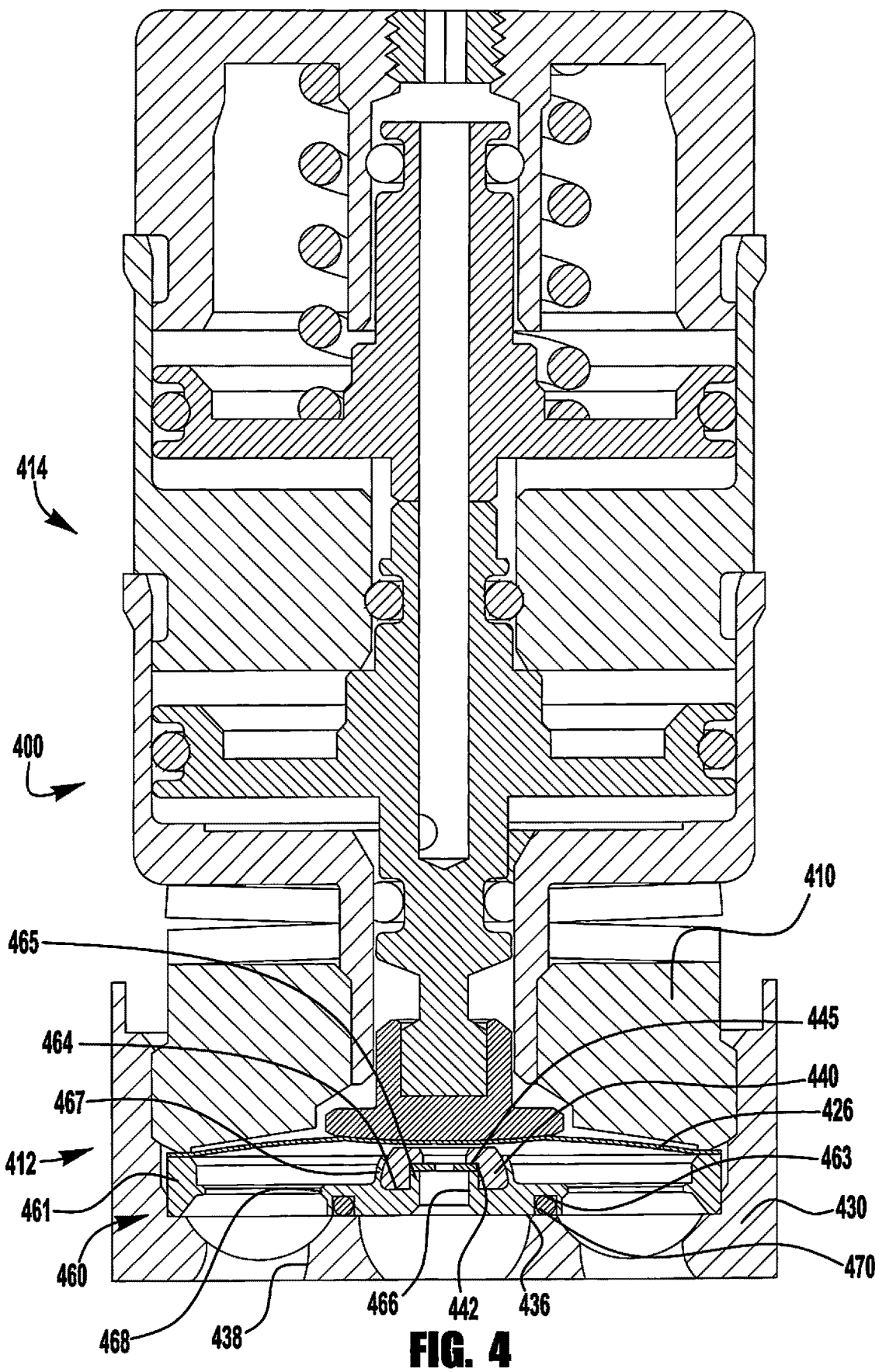
FIG. 4 is a cross-sectional view of a valve assembly with a seat carrier subassembly including an integrated orifice restriction, according to an exemplary embodiment of the present disclosure.
Figure 4A:
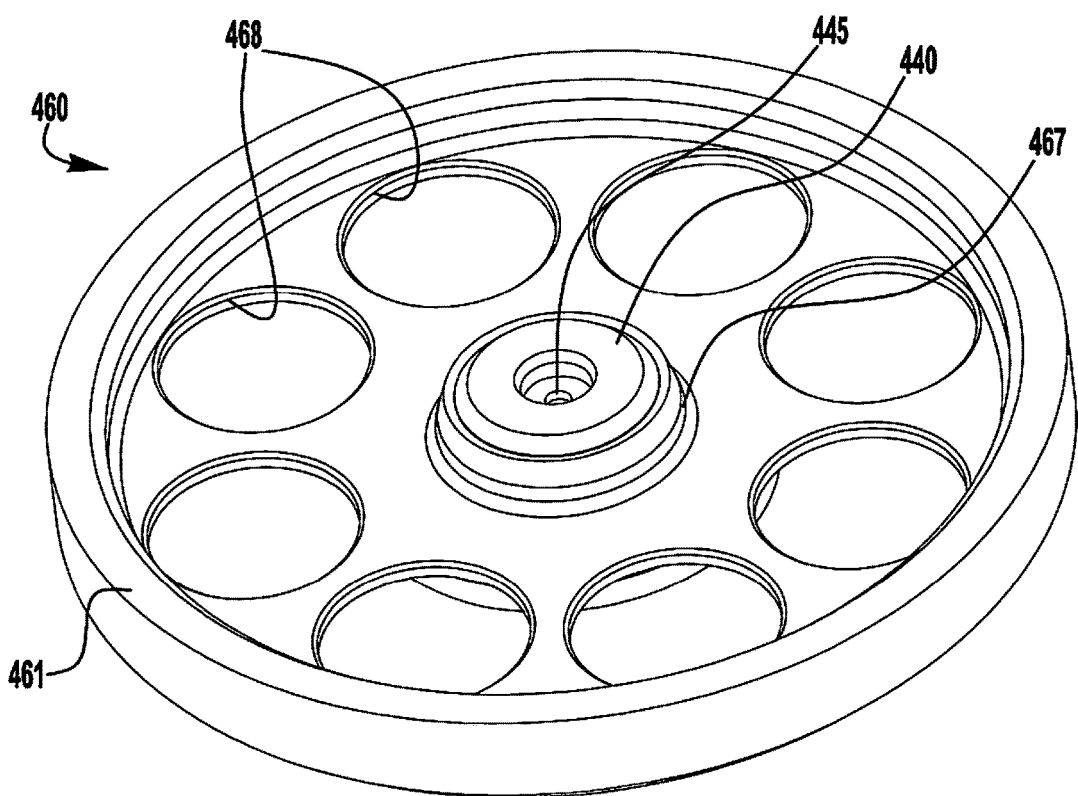
FIG. 4A is a perspective view of the seat carrier subassembly of the valve assembly of FIG. 4.
Figure 4B:
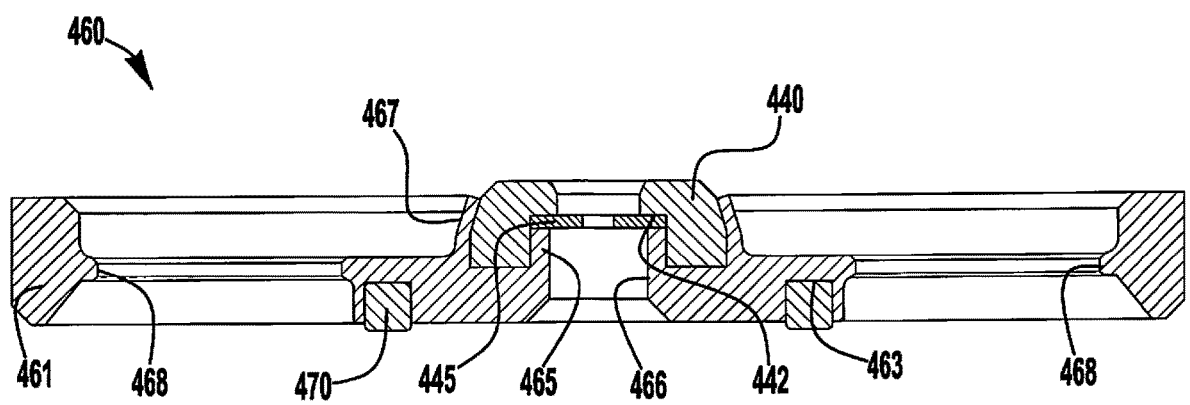
FIG. 4B is a cross-sectional view of the seat carrier subassembly of FIG. 4A.

FIG. 4 illustrates an actuated valve assembly 400, similar to the actuated valve assembly 100 of FIG. 1, but with a seat carrier subassembly 460 installed in the valve cavity 432 of the valve body 430. The seat carrier subassembly 460 (FIGS. 4A and 4B) includes a seat carrier body 461 defining an annular seat recess 464 and inner and outer wall portions 465, 467 retaining a valve seat 440, and first and second flow apertures 466, 468 aligned with (i.e., in direct fluid communication with) first and second fluid ports 436, 438 in the valve body 430. As shown, the seat carrier body 461 may include multiple second flow apertures 468, for example, to provide substantially consistent flow regardless of rotational orientation of the seat carrier subassembly within the valve body. A bonnet nut 410 assembled with the valve body 430 applies a clamping force to an outer periphery of the diaphragm 426 and the seat carrier body 461 to seal the diaphragm against the seat carrier body, and to seal the outer periphery of the seat carrier body against an outer periphery of the seating surface 433. In some embodiments, the diaphragm 426 may be welded to the outer periphery of the seat carrier body 461 to ensure a seal between the seat carrier body and the diaphragm, and to provide the diaphragm as part of the seat carrier subassembly. The exemplary seat carrier subassembly 460 further includes a body seal 470 (e.g., a plastic or polymeric seal ring) retained (e.g., staked or press fit) in an annular groove 463 in the seat carrier body 461 to seal against a body cavity surface 439 surrounding the first fluid port 436 of the valve body 430.

A valve seat 440 includes an internal counterbore or shoulder 442 that receives a flow restricting orifice disc or insert 445, for example, as a press fit subassembly. When the valve seat 440 is staked, crimped, or otherwise installed into the annular seat recess 464, the flow restricting orifice disc 445 is captured or sandwiched between the valve seat counterbore 442 and the annular inner wall portion 465. Once the valve seat 440 is inserted into the recess 464, the outer wall portion 467 may be staked or crimped radially inward to securely retain the valve seat 440.

Figure 5:
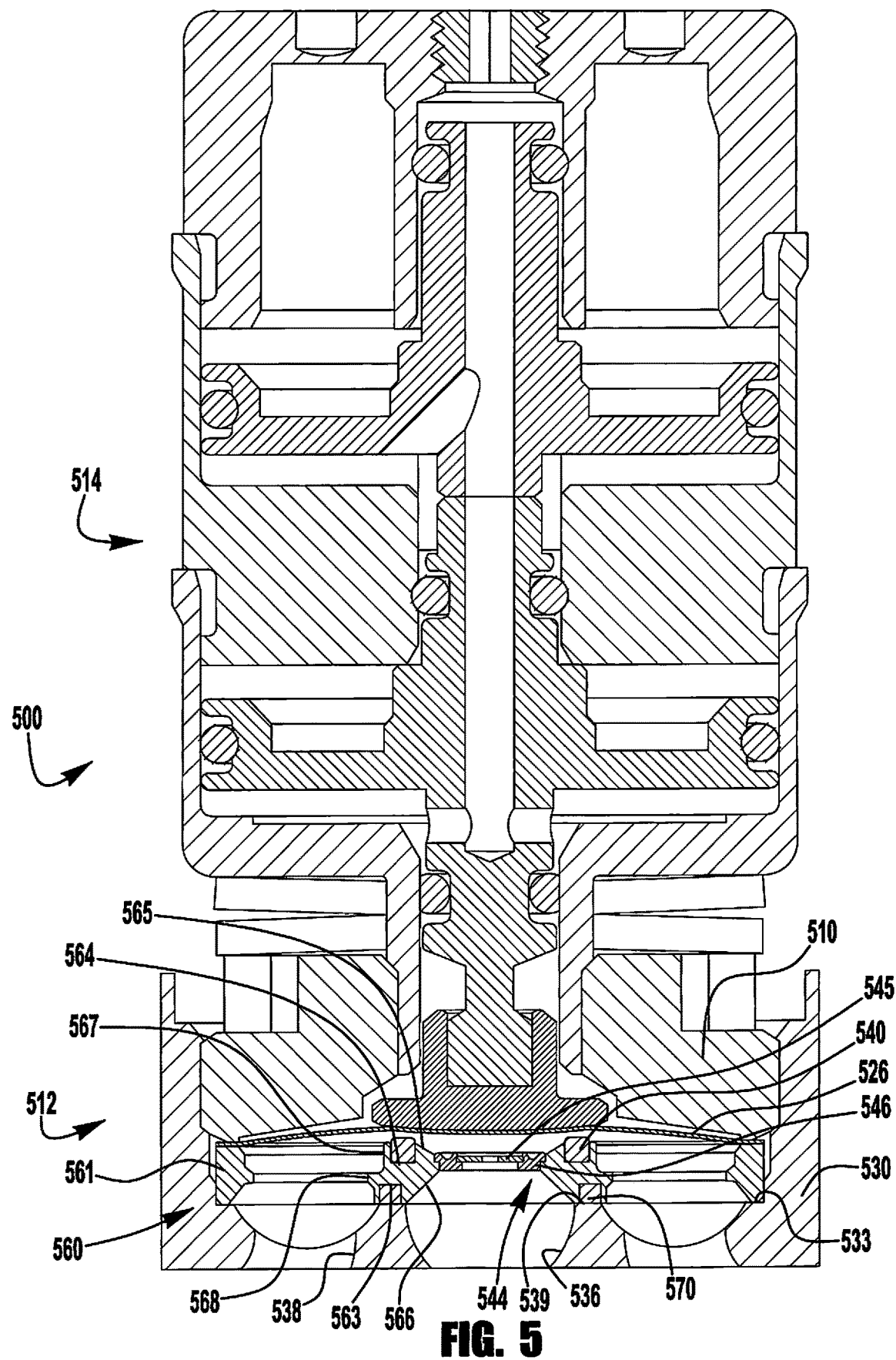
FIG. 5 is a cross-sectional view of a valve assembly with a seat carrier subassembly including an integrated orifice restriction, according to another exemplary embodiment of the present disclosure.

FIG. 5 illustrates an actuated valve assembly 500, similar to the actuated valve assembly 400 of FIG. 4, but with the seat carrier subassembly 560 including an orifice restriction 544 assembled with the annular inner wall portion 565, inward of the valve seat retaining recess 564 and surrounding the first flow aperture 566. While the orifice restriction may be provided as a single piece component to be assembled with the inner wall portion, in the illustrated example, an orifice carrier 546 retaining a flow restricting orifice disc 545 (which may, but need not, be similar to the orifice carrier 246 and disc 245 arrangement shown in FIGS. 2 and 2A and described above) is assembled with the inner wall portion 565, for example, with an outer peripheral step or shoulder 549 seated against an inner peripheral recess 569 of the inner wall portion.

Figure 5A:
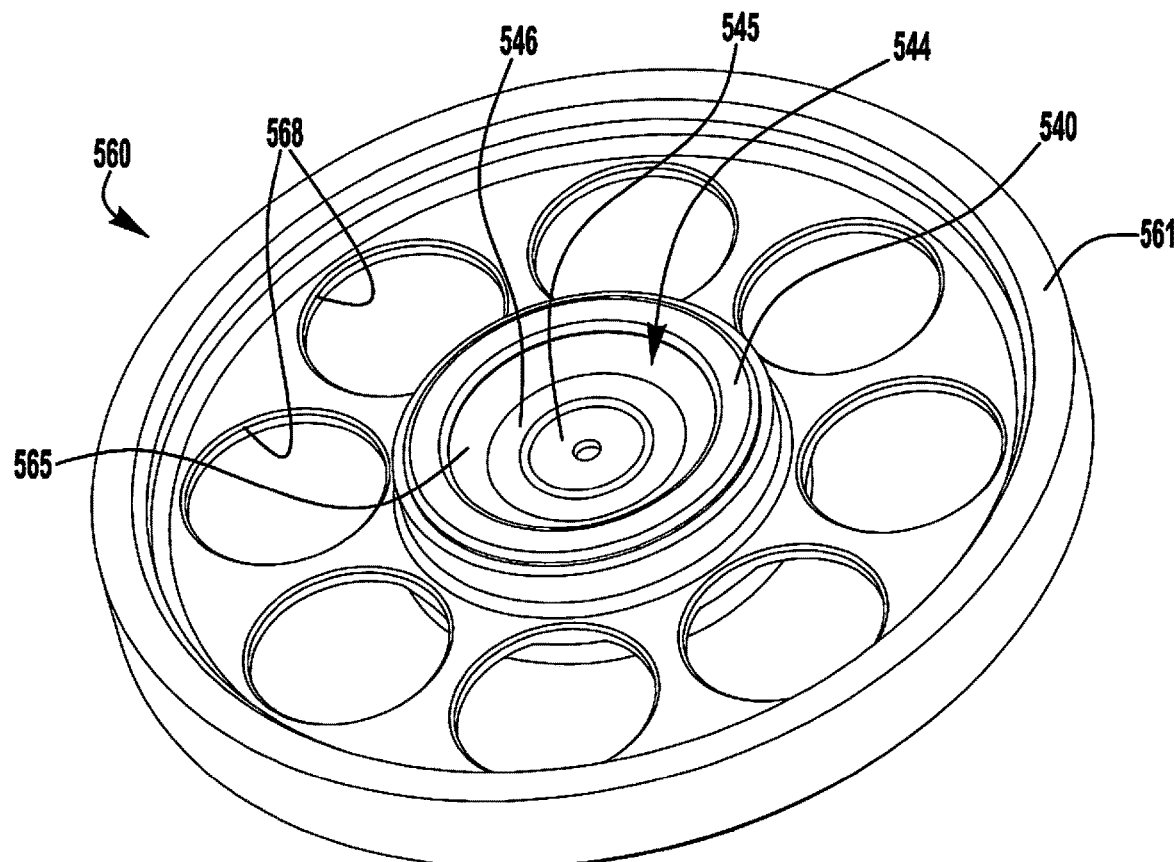
FIG. 5A is a perspective view of the seat carrier subassembly of the valve assembly of FIG. 5, shown without the valve seat.
Figure 5B:
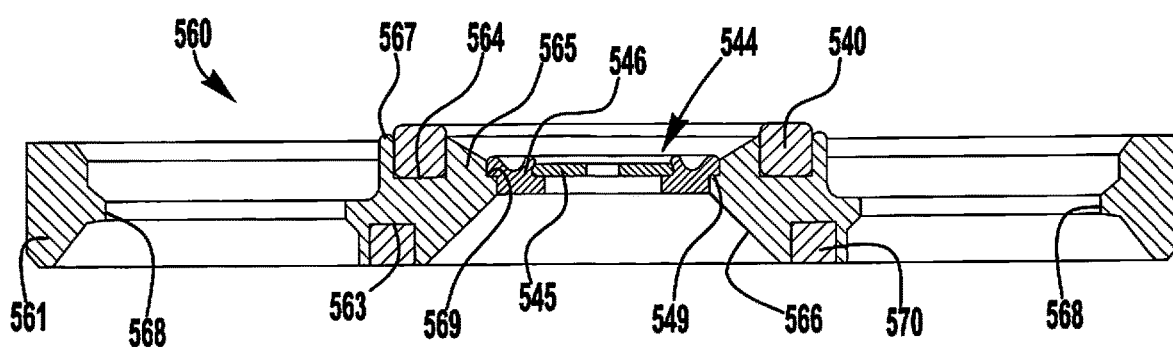
FIG. 5B is a cross-sectional view of the seat carrier subassembly of FIG. 5A.

The seat carrier subassembly 560 (FIGS. 5A and 5B) includes a seat carrier body 561 defining an annular seat recess 564 and inner and outer wall portions 565, 567 retaining a valve seat 540, and first and second flow apertures 566, 568 aligned with (i.e., in direct fluid communication with) first and second fluid ports 536, 538 in the valve body 530. As shown, the seat carrier body 561 may include multiple second flow apertures 568, for example, to provide substantially consistent flow regardless of rotational orientation of the seat carrier subassembly within the valve body. A bonnet nut 510 assembled with the valve body 530 applies a clamping force to an outer periphery of the diaphragm 526 and the seat carrier body 561 to seal the diaphragm against the seat carrier body, and to seal the outer periphery of the seat carrier body against an outer periphery of the seating surface 533. In some embodiments, the diaphragm 526 may be welded to the outer periphery of the seat carrier body 561 to ensure a seal between the seat carrier body and the diaphragm, and to provide the diaphragm as part of the seat carrier subassembly. The exemplary seat carrier subassembly 560 further includes a body seal 570 (e.g., a plastic or polymeric seal ring) retained (e.g., staked or press fit) in an annular groove 563 in the seat carrier body 561 to seal against a body cavity surface 539 surrounding the first fluid port 536 of the valve body 530.

The valve seat 540 may be staked, crimped, or otherwise installed into the annular seat recess 564, for example, with the outer wall portion 567 staked or crimped radially inward to securely retain the valve seat 540.

Figure 5C:
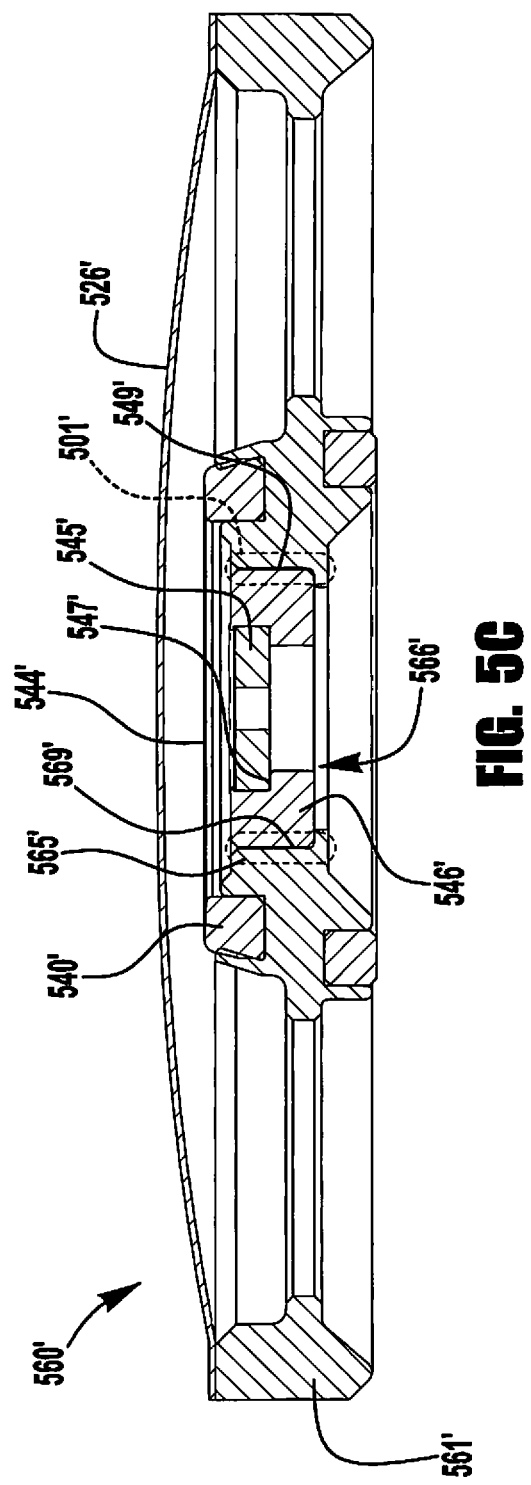
FIG. 5C is a cross-sectional view of a seat carrier subassembly including a orifice carrier and orifice insert in a welded arrangement, according to another exemplary embodiment of the present disclosure.

The outer periphery 549 of the orifice carrier 546 may be press fit or staked into seating engagement with the inner wall portion 565 of the seat carrier body 561. In other embodiments, an orifice carrier may be configured for welded retention with the seat carrier subassembly for installation in a valve body (e.g., any of the seat carrier retaining disclosed herein). FIG. 5C illustrates a seat carrier subassembly 560' including an orifice restriction 544' (which may be consistent with the orifice restriction 244' of FIGS. 2C-2D), with the substantially cylindrical outer periphery 549' of the orifice carrier 546' welded with an interior portion of an annular inner wall portion 565' of the seat carrier body 561', inward of the valve seat 540' and surrounding the first flow aperture 566'. The cylindrical outer periphery 549' of the orifice carrier 546' may be seated against an inner peripheral recess or counterbore 569' of the inner wall portion 565' and welded (at annular weld bead 501') to the annular inner wall portion 565', for example, to securely and sealingly retain the orifice restriction 244' with the seat carrier body 561'. The weld bead 501' may extend along the entire junction between the counterbore portion 569' and the cylindrical outer periphery 549' (e.g., through to the base flange portion of the counterbore), or only a portion of the junction sufficient to eliminate any crevice or seam between the orifice carrier 546' and the annular inner wall portion 565'.

Figure 6:
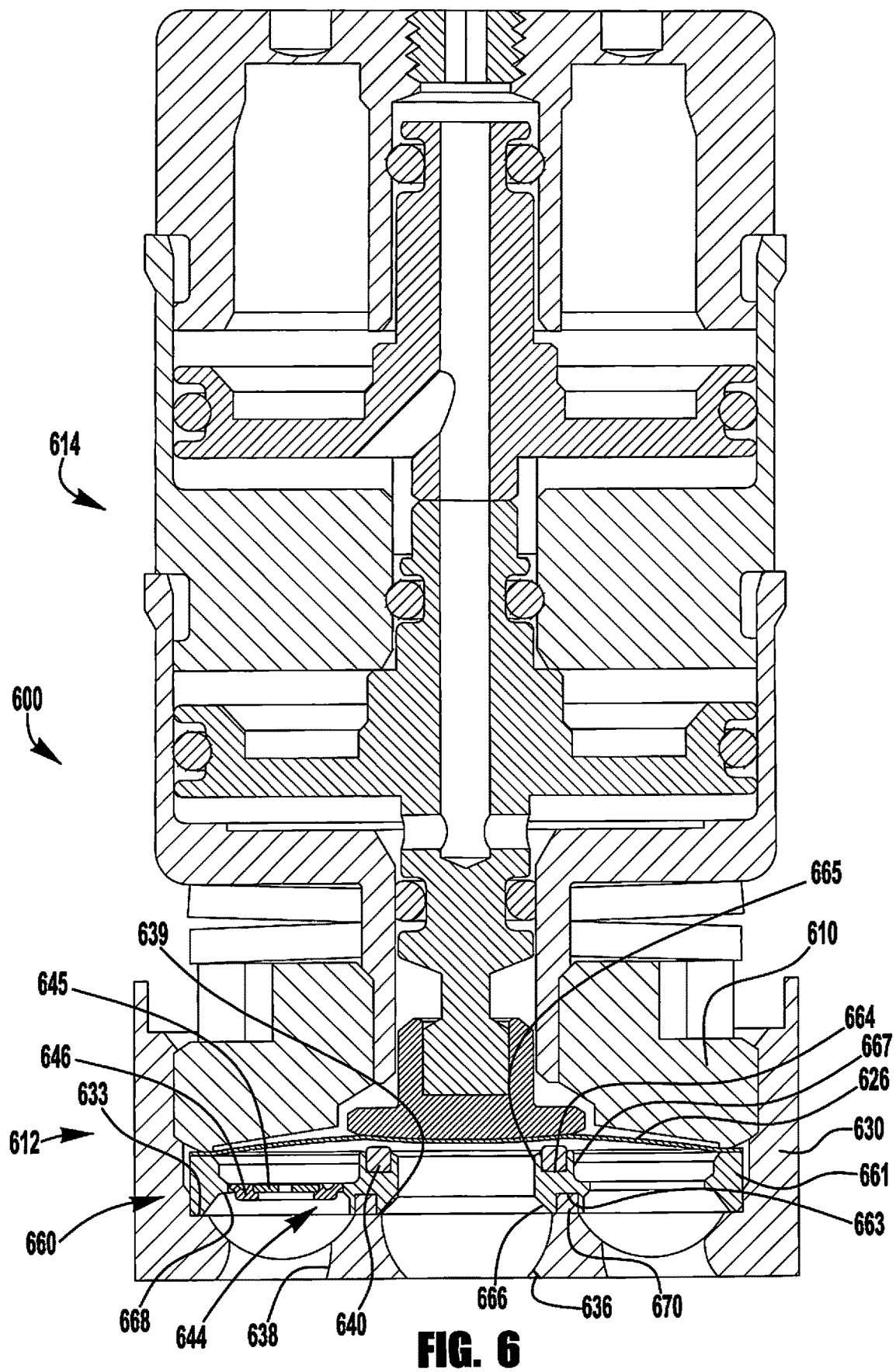
FIG. 6 is a cross-sectional view of a valve assembly with a seat carrier subassembly including an integrated orifice restriction, according to another exemplary embodiment of the present disclosure.

FIG. 6 illustrates an actuated valve assembly 600, similar to the actuated valve assembly 500 of FIG. 5, but with an orifice restriction 644 assembled with an interior portion of an annular inner wall portion at the second flow aperture 668 of the seat carrier 660.

Figure 6A:
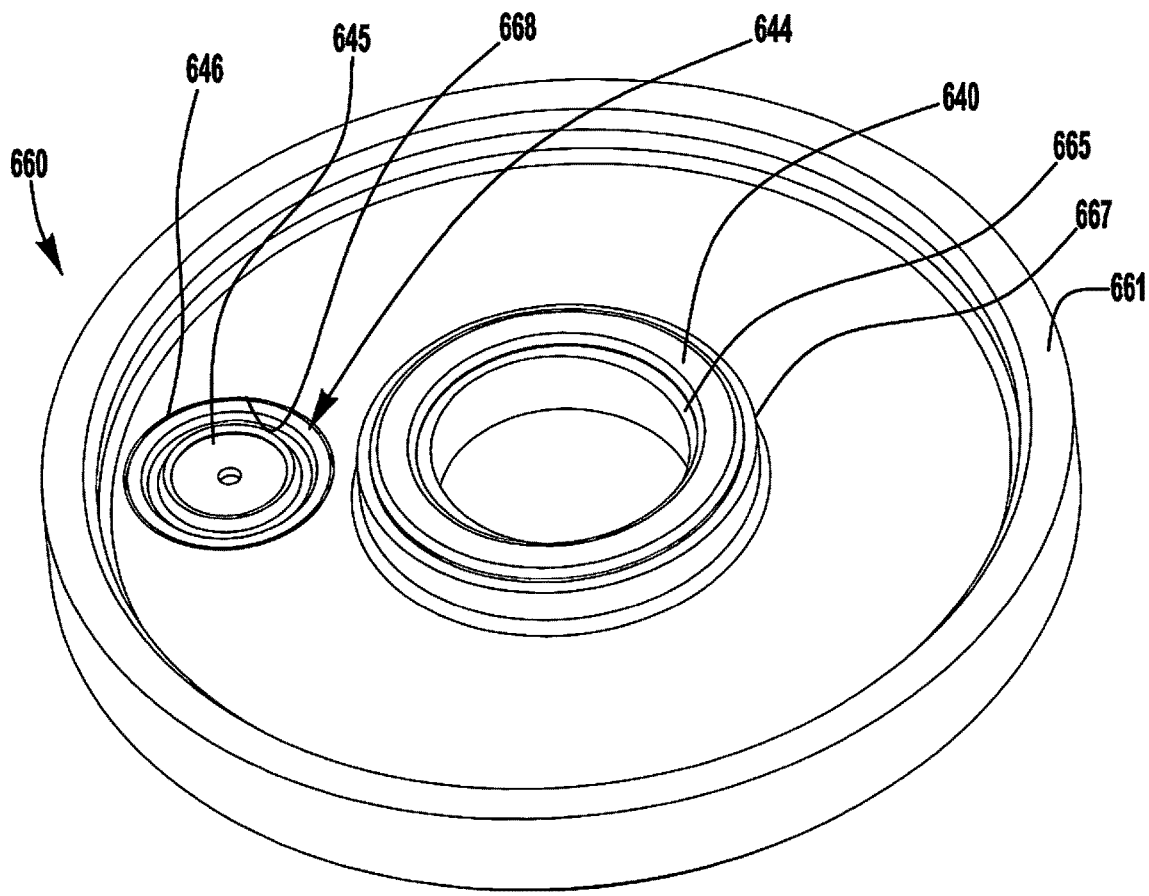
FIG. 6A is a perspective view of the seat carrier subassembly of the valve assembly of FIG. 6, shown without the valve seat.
Figure 6B:
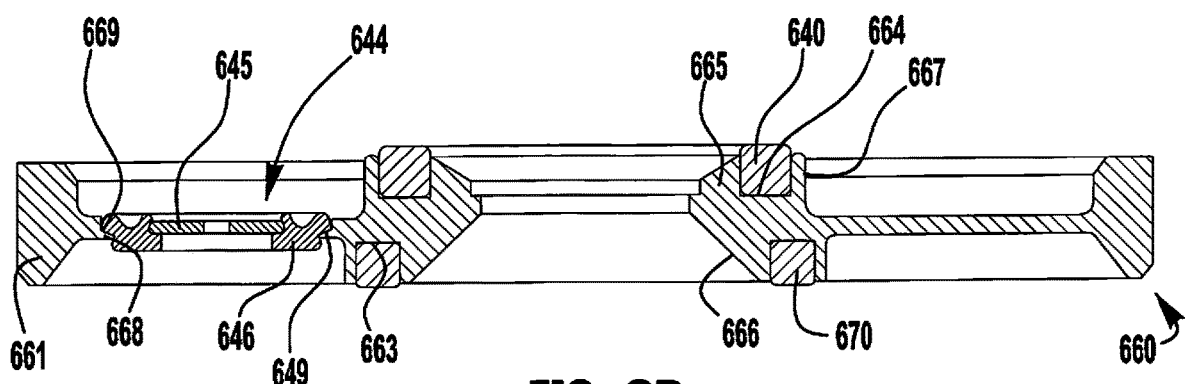
FIG. 6B is a cross-sectional view of the seat carrier subassembly of FIG. 6A.

The seat carrier subassembly 660 (FIGS. 6A and 6B) includes a seat carrier body 661 defining an annular seat recess 664 and inner and outer wall portions 665, 667 retaining a valve seat 640, and first and second flow apertures 666, 668 aligned with (i.e., in direct fluid communication with) first and second fluid ports 636, 638 in the valve body 630. As shown, the seat carrier body 661 may include multiple second flow apertures 668, for example, to provide substantially consistent flow regardless of rotational orientation of the seat carrier subassembly within the valve body. A bonnet nut 610 assembled with the valve body 630 applies a clamping force to an outer periphery of the diaphragm 626 and the seat carrier body 661 to seal the diaphragm against the seat carrier body, and to seal the outer periphery of the seat carrier body against an outer periphery of the seating surface 633. In some embodiments, the diaphragm 626 may be welded to the outer periphery of the seat carrier body 661 to ensure a seal between the seat carrier body and the diaphragm, and to provide the diaphragm as part of the seat carrier subassembly. The exemplary seat carrier subassembly 660 further includes a body seal 670 (e.g., a plastic or polymeric seal ring) retained (e.g., staked or press fit) in an annular groove 663 in the seat carrier body 661 to seal against a body cavity surface 639 surrounding the first fluid port 636 of the valve body 630.

While the orifice restriction may be provided as a single piece component to be assembled with the inner wall portion, in the illustrated example, an orifice carrier 646 retaining a flow restricting orifice disc 645 (which may, but need not, be similar to the orifice carrier 246 and disc 245 arrangement shown in FIG. 2 and described above) is assembled with the inner wall portion 665, for example, with an outer peripheral step or shoulder 649 seated against an inner peripheral recess 669 of the inner wall portion.

In other embodiments, an orifice carrier may be adapted to permit removal from, and replacement in, the seat carrier, for example, without removing the valve seat and/or body seal, and/or with a diaphragm welded to the seat carrier. In one such embodiment, a plastic (e.g., perfluoroalkoxy alkane, or PFA) orifice carrier may be sized to be removably inserted (e.g., press fit) into a central flow aperture in the seat carrier, with an orifice disc installed (e.g., press fit) in a central bore of the orifice carrier.

Figure 7:
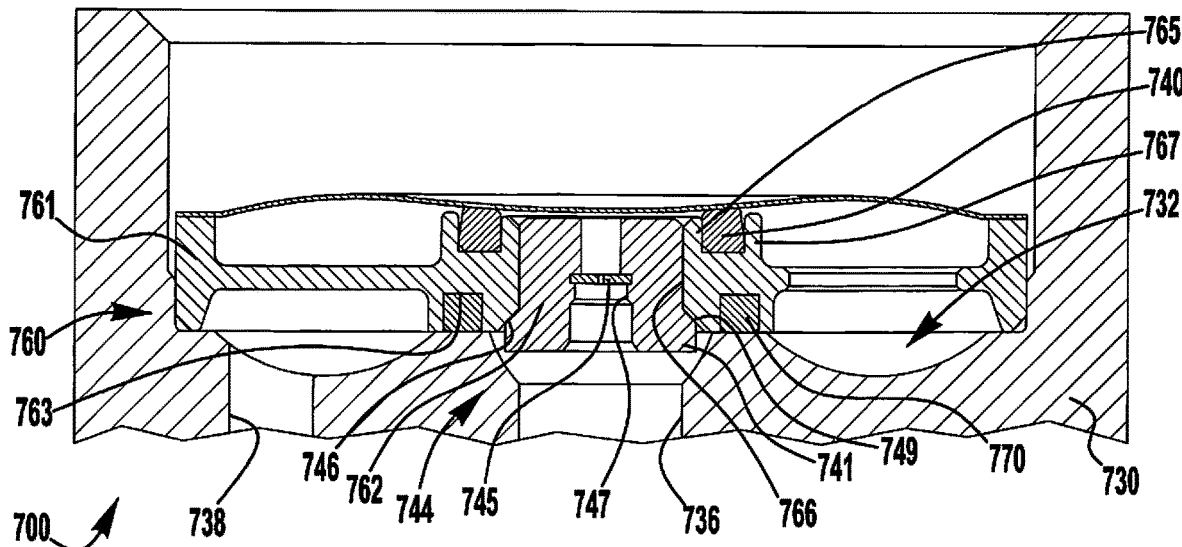
FIG. 7 is a cross-sectional view of a seat carrier subassembly, including an integrated orifice restriction, installed in a valve cavity.
Figure 7A:
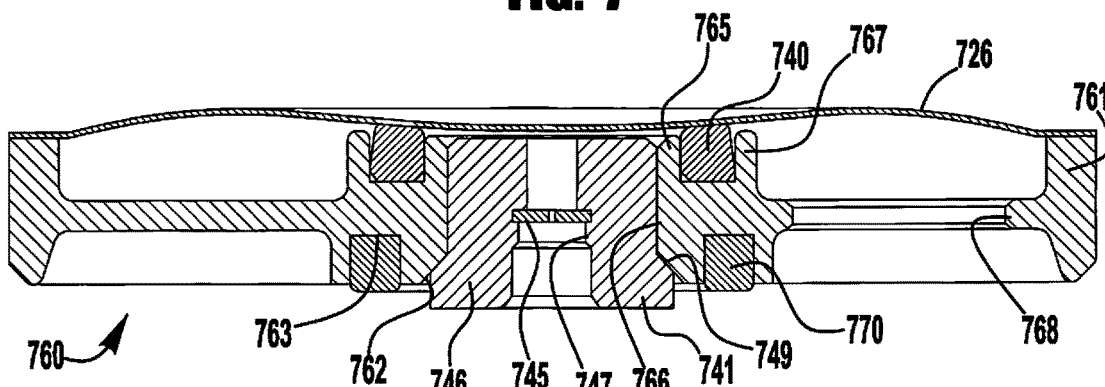
FIG. 7A is a cross-sectional view of the seat carrier subassembly of FIG. 7.
Figure 7B:
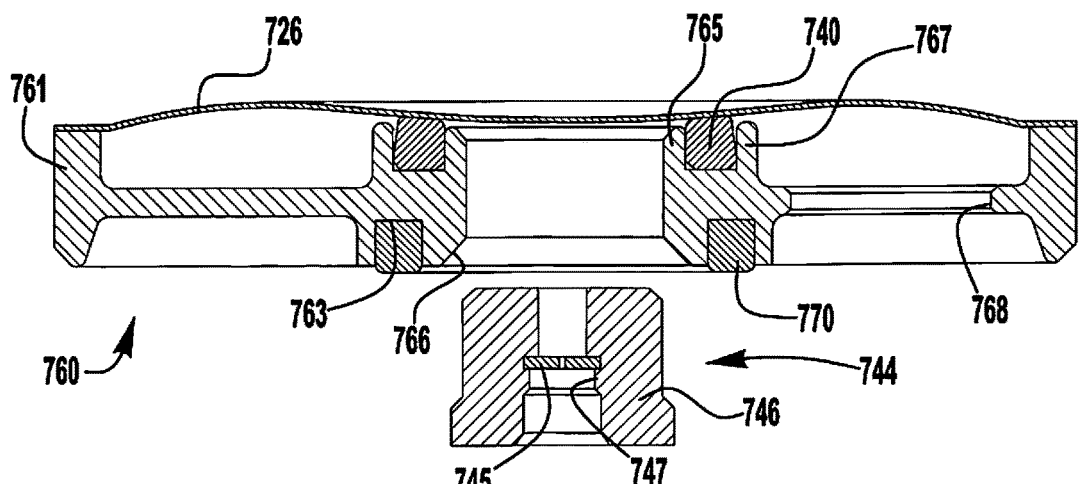
FIG. 7B is a cross-sectional view of the seat carrier subassembly of FIG. 7, shown with the orifice carrier removed from the seat carrier.

FIG. 7 illustrates a valve assembly 700 including a seat carrier subassembly 760 including an orifice restriction 744 assembled with a first, central flow aperture 766 in the seat carrier body 761. While the orifice restriction may be provided as a single piece component to be assembled with the first flow aperture 766, in the illustrated example, a plastic (e.g., PFA) orifice carrier 746 retaining a flow restricting orifice disc 745, press fit into the central bore 747 of the orifice carrier, is press fit into the first flow port 766. As shown in FIGS. 7A and 7B, the orifice carrier 746 may, but need not, extend into alignment with the annular inner wall portion 765, for example, to provide an extended surface of press fit engagement between the seat carrier body 761 and the orifice carrier. The orifice carrier 746 may include an outer shoulder (e.g., chamfered shoulder) 749 that engages a surface (e.g., inner chamfer) 762 of the first flow aperture 766 for proper axial alignment of the orifice carrier 746 in the seat carrier body 761. A distal end 741 of the orifice carrier 746 may be sized to extend beyond the body engaging end of the seat carrier body 761, and into the first fluid port 736 of the valve body 730, for example, to facilitate user grasping and removal of the orifice carrier 746 from a removed seat carrier subassembly 760.

Figure 8:
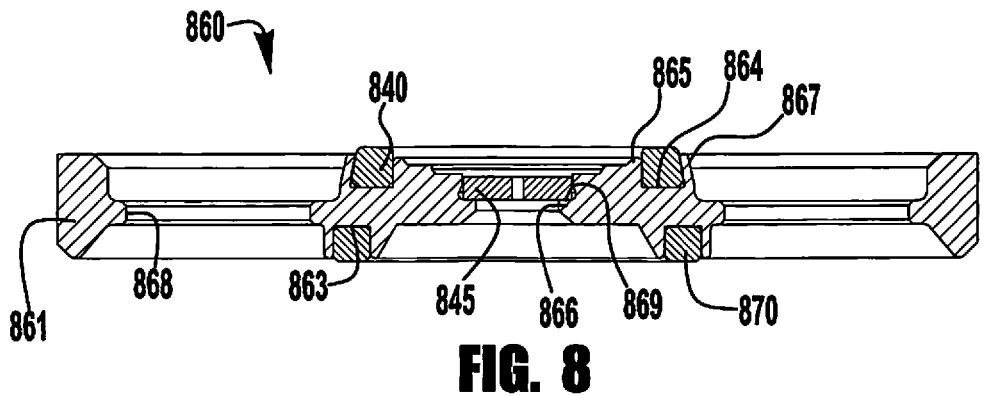
FIG. 8 is a cross-sectional view of a seat carrier subassembly including a staked orifice disc, according to another exemplary embodiment of the present disclosure.

In other embodiments, an orifice restriction may be provided as a flow restricting orifice disc or insert staked directly into a recessed or counterbore portion of a seat carrier, surrounding the seat carrier flow aperture. FIG. 8 illustrates an exemplary seat carrier subassembly 860 for use in a valve assembly (e.g., the valve assembly of any of FIGS. 4, 5, 6, and 7). The seat carrier subassembly 860 includes a flow restricting orifice disc or insert 845 received in an inner peripheral upper counterbore or recess 869 surrounding a first, central flow aperture 866 in a seat carrier body 861, and surrounded by an upper valve seat 840 and a lower body seal 870. The orifice disc 845 is staked or press fit into the inner peripheral recess 869 to provide an interference fit between the orifice disk and the seat carrier body 861. In other embodiments (not shown), a flow restricting orifice disc or insert may be staked or press fit into an inner peripheral lower counterbore or recess surrounding a first, central flow aperture, or into an inner peripheral upper or lower counterbore or recess surrounding a second, offset flow aperture.

In still other embodiments, an orifice restriction may be secured with the seat carrier by a welded arrangement, for example, to minimize or eliminate crevices and associated potential for leak paths and/or spaces for entrapment of contamination. In some such embodiments, the welded arrangement may provide for flexed, live loaded engagement of the orifice restriction to minimize or eliminate crevices around the orifice restriction. In one such embodiment, an orifice restriction may be captured between the seat carrier and an annular disc or weld ring welded with the seat carrier.

Figure 9:
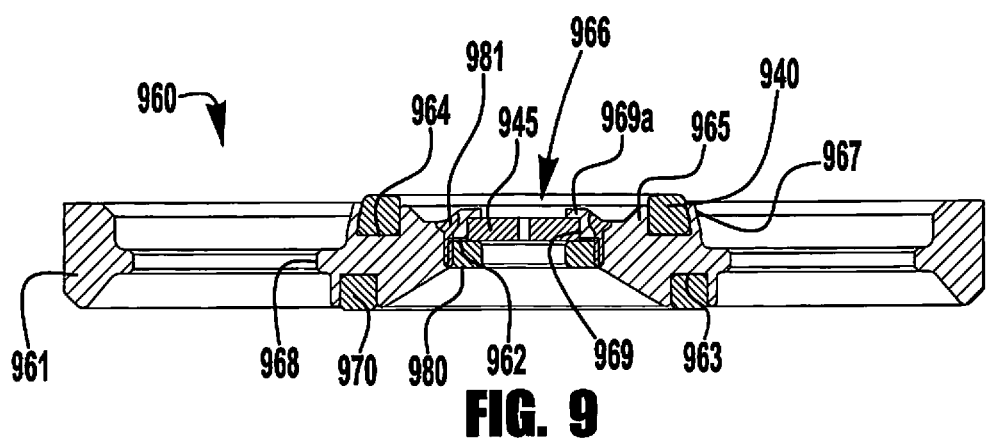
FIG. 9 is a cross-sectional view of a seat carrier subassembly including a welded orifice restriction, according to another exemplary embodiment of the present disclosure.

FIG. 9 illustrates an exemplary seat carrier subassembly 960 for use in a valve assembly (e.g., the valve assembly of any of FIGS. 4, 5, 6, and 7). The seat carrier subassembly 960 includes a flow restricting orifice disc or insert 945 received in an inner peripheral lower counterbore or recess 969 surrounding a first, central flow aperture 966 in a seat carrier body 961, and surrounded by an upper valve seat 940 and a lower body seal 970. The orifice disc 945 is captured in the inner peripheral recess 969 by an annular weld ring 980 received in an outer peripheral lower counterbore or recess 962 in the seat carrier body 961, and welded with the seat carrier body by an annular weld bead 981 penetrating the seat carrier body and weld ring from an upper, diaphragm facing surface of the seat carrier body. As shown, the full penetration of the weld bead 981 may prevent any crevices between the outer peripheral recess 962 and the seat carrier body 961. Further, an axial load applied to the weld ring 980 against the orifice disc 945 may prevent leakage between the weld ring and the orifice restriction, and may provide for flexed, live loaded engagement between an inner lip portion 969a of the seat carrier body 961 and the orifice disc. In other embodiments (not shown), a flow restricting orifice disc or insert may be similarly retained in an inner peripheral lower counterbore or recess surrounding a second, offset flow aperture in the seat carrier body.

Figure 10:
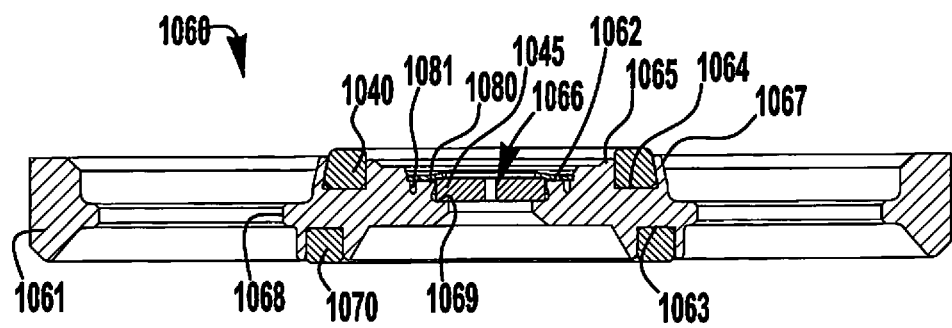
FIG. 10 is a cross-sectional view of a seat carrier subassembly including a welded orifice restriction, according to another exemplary embodiment of the present disclosure.

FIG. 10 illustrates another exemplary seat carrier subassembly 1060 for use in a valve assembly (e.g., the valve assembly of any of FIGS. 4, 5, 6, and 7). The seat carrier subassembly 1060 includes a flow restricting orifice disc or insert 1045 received in an inner peripheral upper counterbore or recess 1069 surrounding a first, central flow aperture 1066 in a seat carrier body 1061, and surrounded by an upper valve seat 1040 and a lower body seal 1070. The orifice disc 1045 is captured in the inner peripheral recess 1069 by an annular weld ring or disc 1080 received in an outer peripheral upper counterbore or recess 1062 in the seat carrier body 1061, and welded with the seat carrier body by an annular weld bead 1081 penetrating the weld ring and seat carrier body from an upper, diaphragm facing surface of the seat carrier body. As shown, the full penetration of the weld bead 1081 may prevent any crevices between the outer peripheral recess 1062 and the seat carrier body 1061. Further, the weld operation may cause the relatively thin annular weld ring or disc 1080 to flex against the orifice disc 1045, for example, to provide for flexed, live loaded engagement between the weld ring and the orifice restriction. In other embodiments (not shown), a flow restricting orifice disc or insert may be similarly retained in an inner peripheral upper counterbore or recess surrounding a second, offset flow aperture in the seat carrier body.

Figure 11:
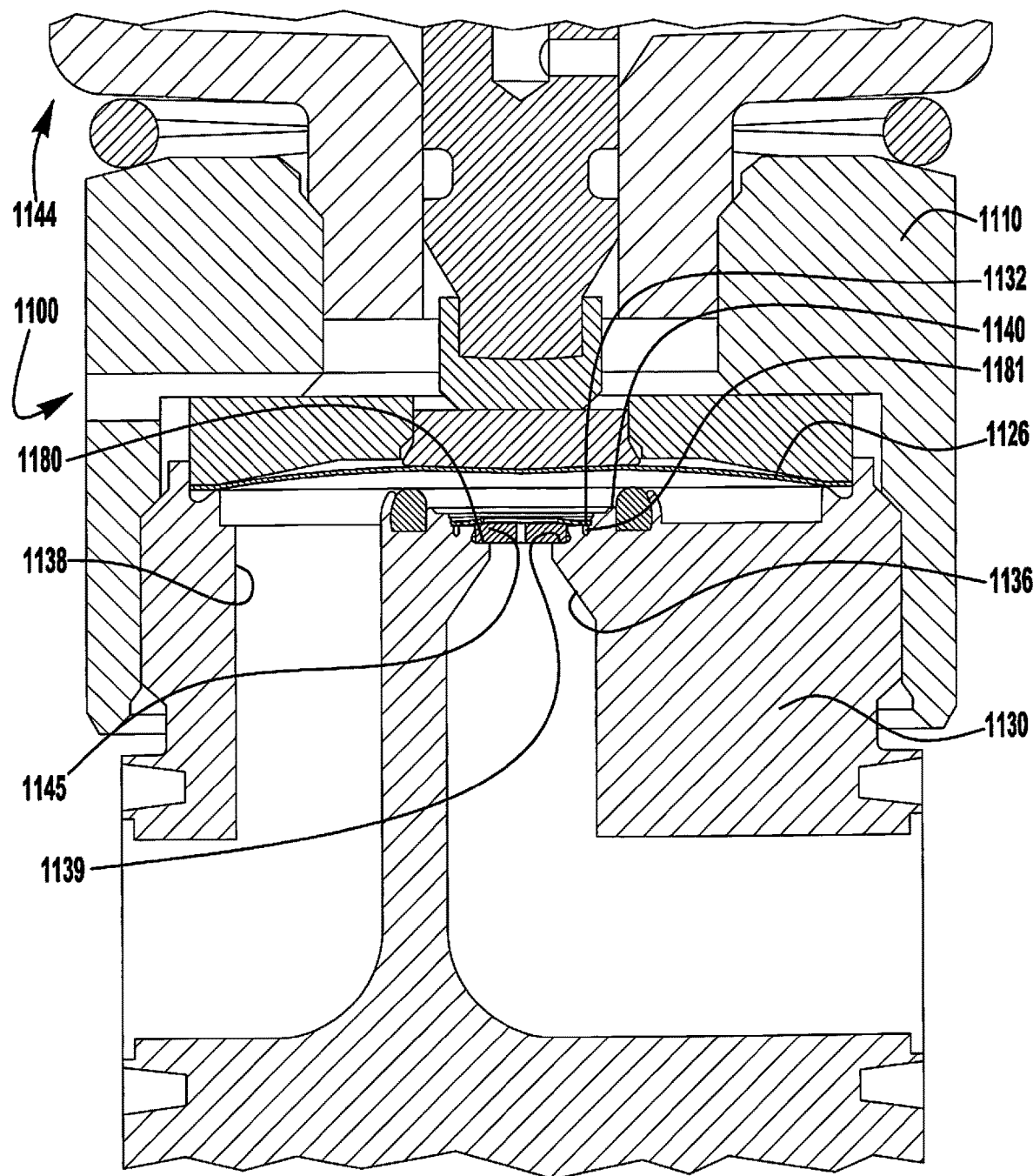
FIG. 11 is a cross-sectional view of a valve assembly with an integrated orifice restriction, according to another exemplary embodiment of the present disclosure.

In other exemplary embodiments, similar weld retained orifice restriction arrangements may be directly integrated with a valve body. FIG. 11 illustrates an exemplary actuated valve assembly 1100, similar to the actuated valve assemblies 100, 200, 300 of FIGS. 1, 2, and 3, but with a flow restricting orifice disc or insert 1145 secured with an interior portion of an annular inner wall portion 1135 of the valve body 1130 by a welded arrangement, inward of the valve seat retaining recess 1134 and surrounding the first fluid port 1136. The orifice disc 1145 is received in an inner peripheral upper counterbore or recess 1139 surrounding the first fluid port 1136, and surrounded by an upper valve seat 1140. The orifice disc 1145 is captured in the inner peripheral recess 1139 by an annular weld ring or disc 1180 received in an outer peripheral upper counterbore or recess 1132 in the valve body 1130, and welded with the valve body by an annular weld bead 1181 penetrating the weld ring and valve body from an upper, diaphragm facing surface of the valve body. As shown, the full penetration of the weld bead 1181 may prevent any crevices between the outer peripheral recess 1132 and the valve body 1130. Further, the weld operation may cause the relatively thin annular weld ring or disc 1180 to flex against the orifice disc 1145, for example, to provide for flexed, live loaded engagement between the weld ring and the orifice restriction.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A valve comprising:
   a valve body including a valve cavity and first and second fluid ports extending to the valve cavity;
   a seat carrier subassembly installed in the valve cavity, the seat carrier subassembly comprising a seat carrier body including a first annular inner wall defining a first flow aperture aligned with the first fluid port and a valve seat disposed in an annular recess surrounding the first annular inner wall, and a second annular inner wall defining a second flow aperture aligned with the second fluid port;
   a valve element disposed within the valve cavity and movable between a closed position sealing against the valve seat and an open position permitting fluid flow across the valve seat between the first and second flow apertures; and
   an orifice restriction having an outer periphery seated against an interior portion of one of the first annular inner wall and the second annular inner wall.

2. The valve of claim 1, wherein the orifice restriction comprises a flow restricting orifice disc, with the orifice disc being seated against the interior portion of the one of the first annular inner wall and the second annular inner wall.

3. The valve of claim 1, wherein the orifice restriction is seated against the interior portion of the second annular inner wall.

4. The valve of claim 1, wherein the orifice restriction is seated against the interior portion of the first annular inner wall.

5. The valve of claim 1, wherein the outer periphery of the orifice restriction is staked into the interior portion of the one of the first annular inner wall and the second annular inner wall.

6. The valve of claim 1, wherein the outer periphery of the orifice restriction is welded to the interior portion of the one of the first annular inner wall and the second annular inner wall.

7. The valve of claim 1, wherein valve element comprises a diaphragm.

8. The valve of claim 7, wherein the diaphragm is welded to the seat carrier body.

9. The valve of claim 1, wherein the orifice restriction is captured between the interior portion of the one of the first annular inner wall and the second annular inner wall and a weld ring welded to the seat carrier body.

10. The valve of claim 9, wherein the weld ring is welded to an upper surface of the seat carrier body.

11. The valve of claim 9, wherein the weld ring is welded to a lower surface of the seat carrier body.

12. The valve of claim 9, wherein the weld ring is flexed against the orifice restriction for live loaded engagement between the weld ring and the orifice restriction.

13. The valve of claim 9, wherein an inner lip portion of the seat carrier body is flexed against the orifice restriction for live loaded engagement between the seat carrier body and the orifice restriction.

14. The valve of claim 1, wherein the orifice restriction comprises an orifice carrier retaining a flow restricting orifice disc, with the orifice carrier defining the outer periphery of the orifice restriction.

15. The valve of claim 14, wherein the orifice carrier includes an inner diameter counterbore receiving the flow restricting orifice disc, and a surrounding wall portion crimped over an outer edge of the orifice disc.

16. The valve of claim 14, wherein the orifice carrier comprises a plastic orifice carrier press fit against the one of the first annular inner wall and the second annular inner wall.

17. The valve of claim 16, wherein the orifice carrier includes an outer shoulder that engages a surface of the seat carrier body to axially position the orifice carrier within the seat carrier body.

18. The valve of claim 16, wherein a distal end of the orifice carrier extends beyond a body engaging end of the seat carrier body and into the first fluid port of the valve body.

19. A valve comprising:
- a valve body having a valve cavity and first and second fluid ports extending to the valve cavity;
- an annular valve seat surrounding the first fluid port;
- a valve element disposed within the valve and movable between a closed position sealing against the valve and an open position permitting fluid flow across the valve seat; and
- an orifice restriction seated against an annular inner wall aligned with one of the first and second fluid ports to restrict flow through the one of the first and second fluid ports;
- wherein the orifice restriction is captured between an interior portion of the annular inner wall and a weld ring welded to a seat carrier body installed in the valve cavity.

20. The valve of claim 19, wherein the weld ring is welded to an upper surface of the seat carrier body.

21. The valve of claim 19, wherein the weld ring is welded to a lower surface of the seat carrier body.

22. The valve of claim 19, wherein the weld ring is flexed against the orifice restriction for live loaded engagement between the weld ring and the orifice restriction.

23. The valve of claim 19, wherein an inner lip portion of the seat carrier body is flexed against the orifice restriction for live loaded engagement between the seat carrier body and the orifice restriction.

24. The valve of claim 19, wherein the annular inner wall is aligned with the second fluid port.

25. The valve of claim 19, wherein the seat carrier body defining the annular inner wall.

26. The valve of claim 25, wherein the valve element comprises a diaphragm welded to the seat carrier body.

27. The valve of claim 19, wherein the annular inner wall is aligned with the first fluid port.

28. The valve of claim 27, wherein the annular valve seat is secured in an annular recess surrounding the first fluid port, the annular recess being defined by the annular inner wall and an outer annular wall.

* * * * *